(12) United States Patent
Truesdell et al.

(10) Patent No.: US 10,648,536 B2
(45) Date of Patent: May 12, 2020

(54) LENGTH ADJUSTING DEVICES AND METHOD OF USING THE SAME

(71) Applicant: Buckingham Manufacturing Company, Inc., Binghamton, NY (US)

(72) Inventors: Kevin Truesdell, Binghamton, NY (US); Timothy R. Batty, Binghamton, NY (US); James J. Rullo, Binghamton, NY (US)

(73) Assignee: Buckingham Manufacturing Company, Inc., Binghamton, NY (US)

(*) Notice: Subject to any disclaimer, the term of this patent is extended or adjusted under 35 U.S.C. 154(b) by 29 days.

(21) Appl. No.: 15/989,305

(22) Filed: May 25, 2018

(65) Prior Publication Data
US 2018/0340592 A1 Nov. 29, 2018

Related U.S. Application Data

(60) Provisional application No. 62/511,742, filed on May 26, 2017.

(51) Int. Cl.
| | |
|---|---|
| *F16G 11/12* | (2006.01) |
| *A62B 1/14* | (2006.01) |
| *F16G 1/14* | (2006.01) |
| *A63B 27/00* | (2006.01) |
| *F16G 11/10* | (2006.01) |
| *F16G 11/14* | (2006.01) |

(52) U.S. Cl.
CPC ............... *F16G 11/12* (2013.01); *A62B 1/14* (2013.01); *A63B 27/00* (2013.01); *F16G 11/106* (2013.01); *F16G 11/146* (2013.01)

(58) Field of Classification Search
CPC .. A62B 1/14; B66D 5/16; F16G 11/12; F16G 11/106; F16G 11/10; F16G 11/105
See application file for complete search history.

(56) References Cited

U.S. PATENT DOCUMENTS

| | | | | |
|---|---|---|---|---|
| 4,620,499 A | * | 11/1986 | Slemmons | B63B 21/08 114/218 |
| 6,155,384 A | * | 12/2000 | Paglioli | A62B 1/14 188/65.2 |
| 7,108,099 B2 | * | 9/2006 | Ador | A62B 1/14 182/192 |
| 7,287,304 B2 | * | 10/2007 | Zebe, Jr. | A43C 7/04 24/134 P |

(Continued)

*Primary Examiner* — Thomas J Williams
(74) *Attorney, Agent, or Firm* — Bond Schoeneck & King, PLLC; George McGuire; Frederick Price

(57) ABSTRACT

A length adjusting device includes: a body having sides extending in spaced relation to one another, the sides defining respective planes; a first cam operably assembled in relation to the body and having a first proximal cam end positioned between the sides; a second cam operably assembled in relation to the body and having a second proximal cam end positioned between the sides and adjacent to the first proximal cam end; an axle that rotatably attaches the second cam to the body; a channel formed by a space between the cam ends; a handle attached to the body and rotatable from a first position to a second position about a rotation point upon application of a first force; wherein the body is configured to rotate with respect to the second cam to expand the size of the channel upon the application of the first force exerted on the handle.

19 Claims, 10 Drawing Sheets

(56) References Cited

U.S. PATENT DOCUMENTS 8,348,016 B2 * 1/2013 Lewis ............... A62B 1/14
 182/192
8,375,526 B2 * 2/2013 Everett ............. A62B 1/14
 182/192

* cited by examiner

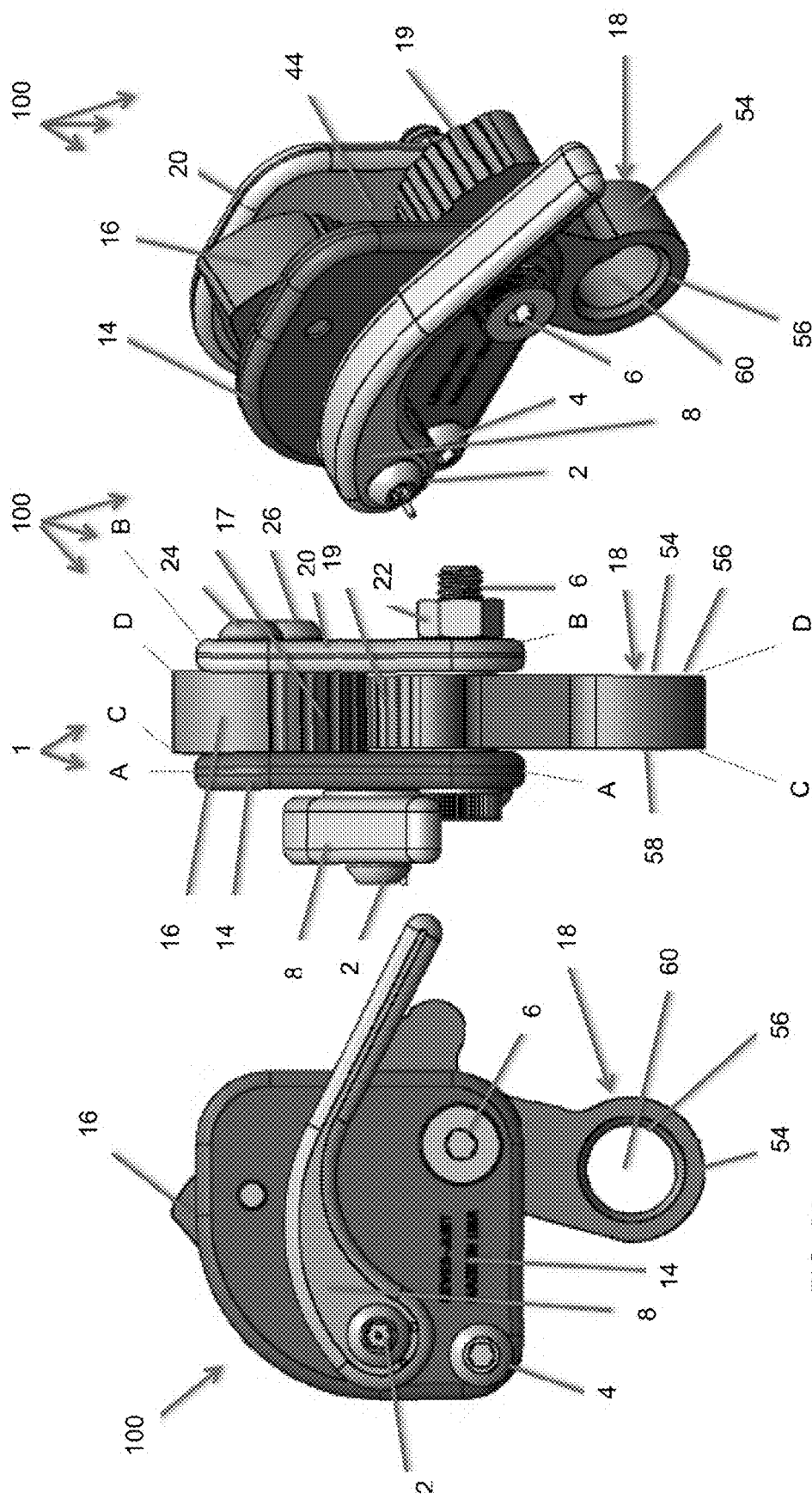

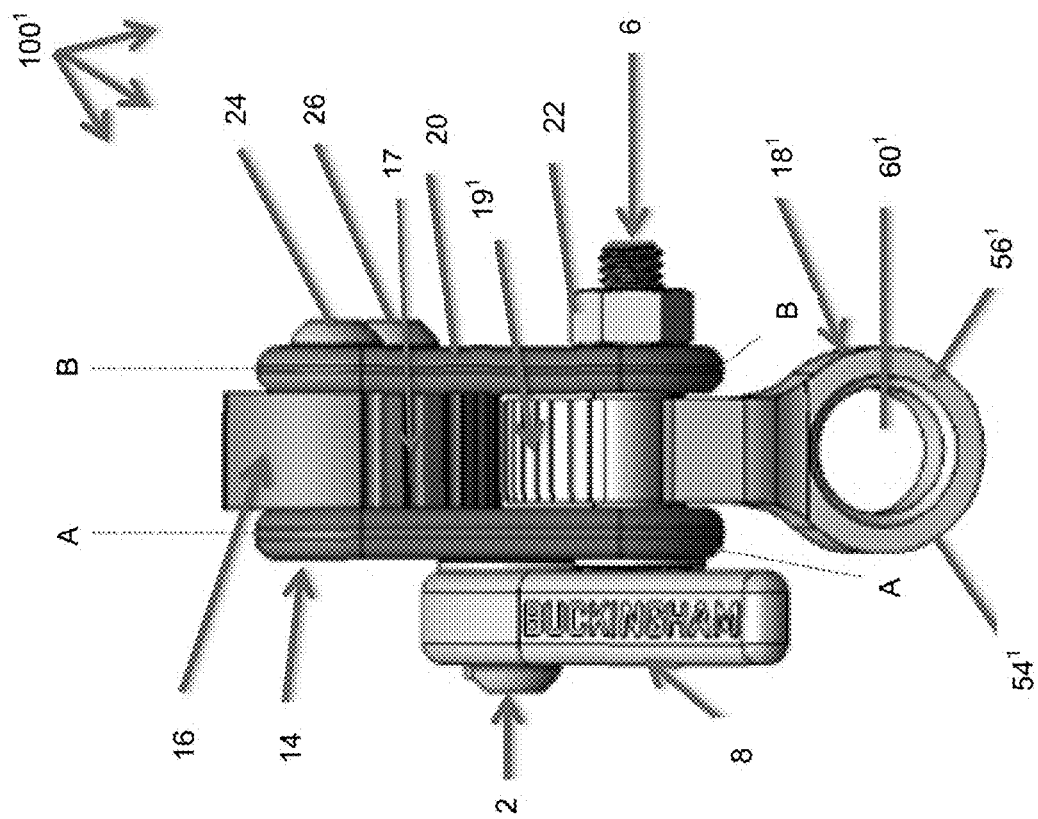
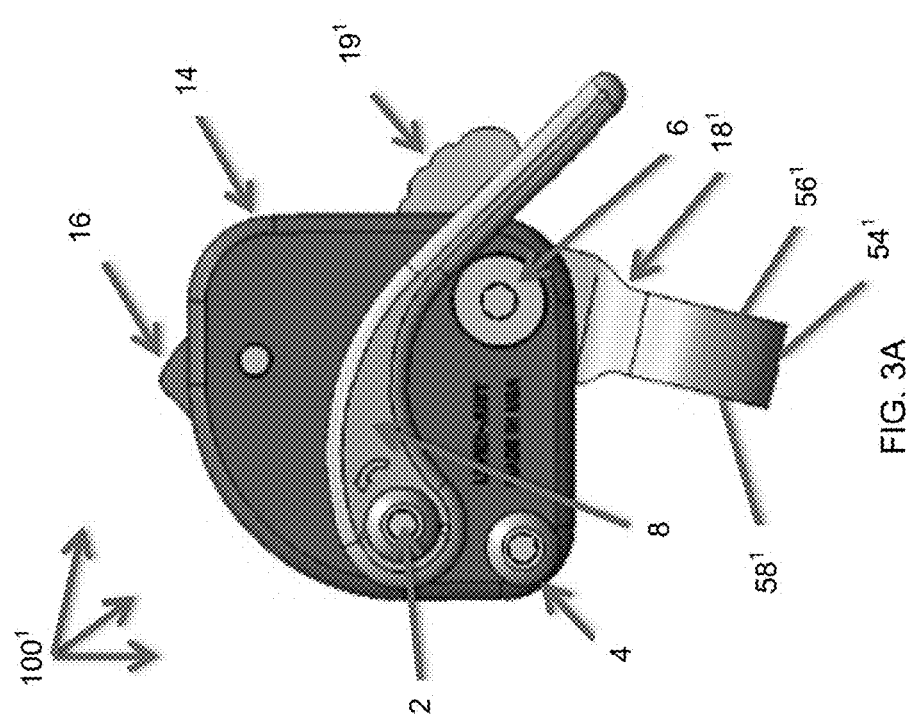
FIG. 3B
FIG. 3A

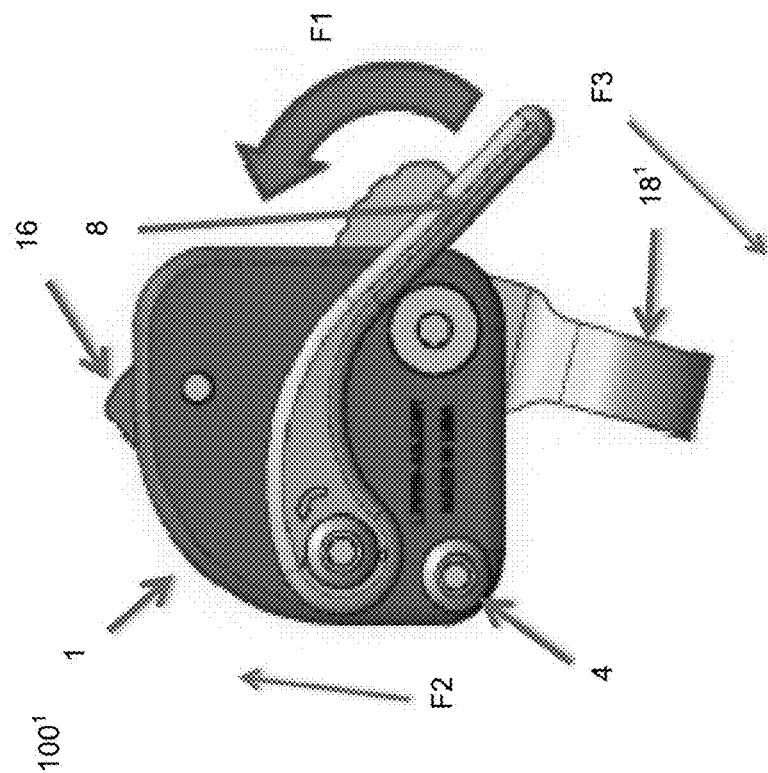
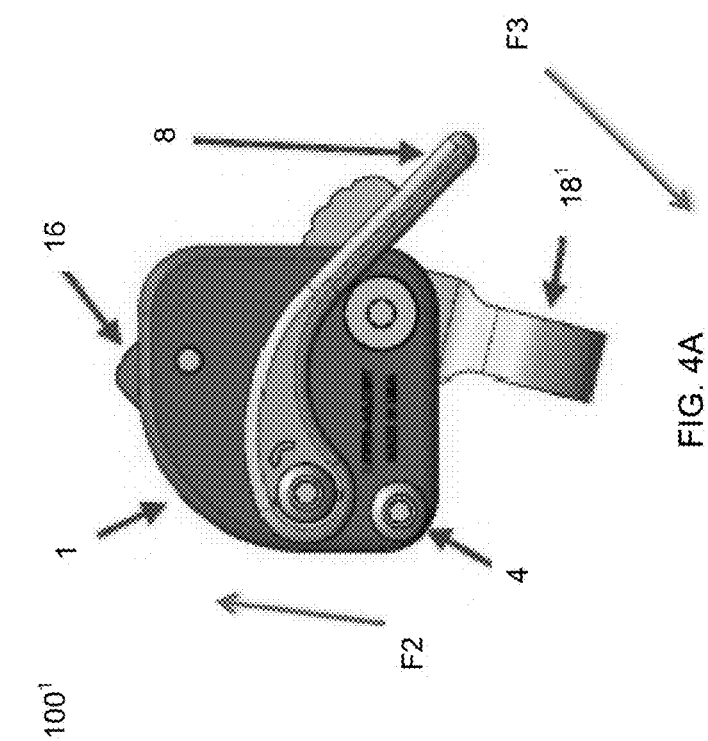

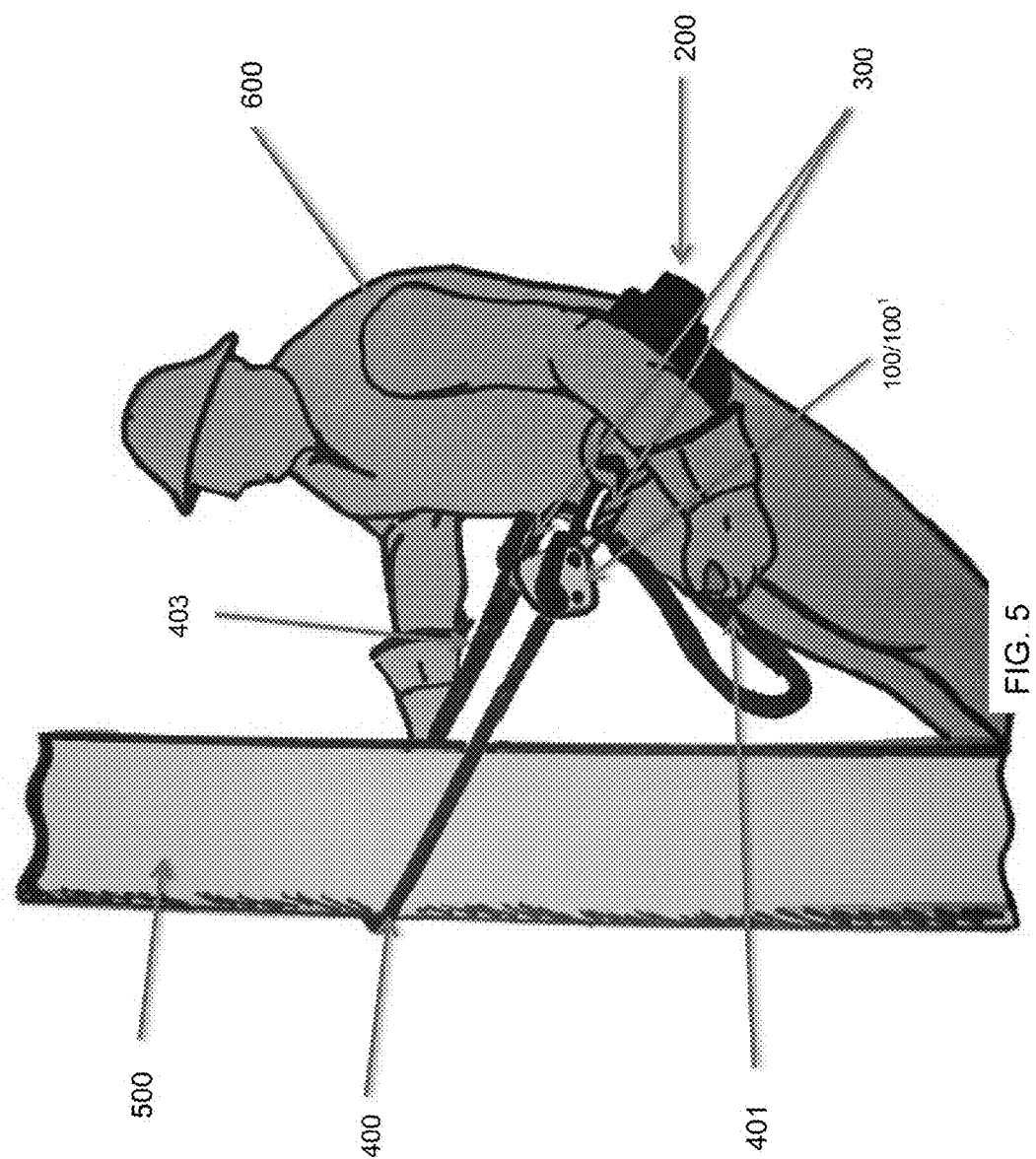

LENGTH ADJUSTING DEVICES AND METHOD OF USING THE SAME

CROSS-REFERENCE TO RELATED APPLICATION

The present application relates and claims priority to U.S. Provisional Application No. 62/511,742 filed May 26, 2017, the entirety of which is hereby incorporated by reference

FIELD OF THE INVENTION

The present disclosure relates generally to length adjusting devices (LADs) and, more particularly, to a length adjusting devices adapted and optimized for use with a lanyard.

BACKGROUND

Length adjusting devices (or LADs) are often referred to by a variety of names by arborists, linesmen, climbers, and other workers or athletes engaged in aerial pursuits. Other such terms include rope grabs, rope adjusters, rope clamps, ascenders, descenders, descent control devices, microscenders, micrograb rescuescenders, etc. These devices typically consist of a frame supporting an axle around which an engaging cam may pivot. The cam has engaging teeth on a portion of its outer perimeter. Rotation of the cam moves these engaging teeth between: a position at which a rope may readily slide between an inner portion of the frame and the engaging teeth; and a position where the engaging teeth prevent passage of the rope through the frame. An eye or other connection point is fixed on an outer arm of the cam assembly. The eye allows attachment of a device (e.g., a work positioning lanyard, carabineer, or the like) to a body belt D-ring or allows attachment of a device to the length adjusting device.

Various conventional forms of length adjusting devices are known. However, these conventional length adjusting devices are structured and configured to require the user to remove their weight from the conventional length adjusting device unit to allow the user to adjust out (lengthen) a lanyard positioned therethrough. Further, such a configuration requires a user to use both hands, one to take the users weight off the conventional length adjusting device and the other hand to adjust the device to allow the lanyard through the device.

Accordingly, there is a need in the art for improved length adjusting devices and methods for using such devices to allow a user to adjust out (lengthen) an adjustable positioning lanyard positioned through the length adjusting device while the user's weight is still on the device. Such a device should also allow the user to make adjustments to the device with one hand.

Description of the Related Art Section Disclaimer

To the extent that specific patents/publications/products are discussed above in this Background Section or elsewhere in this Application, these discussions should not be taken as an admission that the discussed patents/publications/products are prior art for patent law purposes. For example, some or all of the discussed patents/publications/products may not be sufficiently early in time, may not reflect subject matter developed early enough in time and/or may not be sufficiently enabling so as to amount to prior art for patent law purposes. To the extent that specific patents/publications/products are discussed above in this Background Section and/or throughout the application, the descriptions/disclosures of which are all hereby incorporated by reference into this document in their respective entirety(ies).

SUMMARY OF THE INVENTION

The present disclosure is directed to inventive devices and methods for adjustment of a lanyard (webbing or rope lanyard) through a length adjusting device to form an adjustable positioning lanyard (or APL) used for work positioning on a structure or pole. A particular non-limiting goal of utilization of the embodiments and implementations herein is to provide a length adjusting device configured and/or structured to allow a user to adjust in/out (shorten/lengthen) the lanyard (allows and disallows passage of lanyard through the length adjusting device) while the user's weight is still on the length adjusting device. In addition, the length adjusting device of an embodiment of the present invention is configured and/or structured to allow the user to make such adjustments with one hand.

The fasteners described herein can include, but are not limited to, nuts and bolts, screws, nails, anchors, and pins of varied compositions (as should be understood and appreciated by those of skill in the art in conjunction with a review of this disclosure).

Generally, in one aspect, a length adjusting device includes: a body having a first side and a second side extending in spaced relation to one another, the first and second sides defining first and second planes, respectively; a first cam operably assembled in relation to the body and having a first proximal cam end positioned between the first and second sides; a second cam operably assembled in relation to the body and having a second proximal cam end positioned between the first and second sides and adjacent to the first proximal cam end; an axle that rotatably attaches the second cam to the body; a channel formed by a space between the first proximal cam end and the second proximal cam end; a handle attached to the body and rotatable from a first position to a second position about a rotation point upon application of a first force; wherein the body is configured to rotate with respect to the second cam from a third position to a fourth position to expand the size of the channel upon the application of the first force exerted on the handle towards the second position.

According to an additional aspect, a length adjusting device includes: a body having a first side and a second side extending in spaced relation to one another, the first and second sides defining first and second planes, respectively; a first cam operably assembled in relation to the body and having a first proximal cam end positioned between the first and second sides; a second cam operably assembled in relation to the body and having a second proximal cam end positioned between the first and second sides and adjacent to the first proximal cam end; an axle that rotatably attaches the second cam to the body; a channel formed by a space between the first proximal cam end and the second proximal cam end; wherein the second cam is configured to rotate with respect to the body from a first position to a second position to expand the size of the channel upon the application of a first force exerted on the second cam towards the second position.

According to a further aspect, a system for using a length adjusting device adapted to be tethered to a user via an external device, and capable of surrounding and selectively moving along a lanyard, includes: a length adjusting device including: a body having a first side and a second side extending in spaced relation to one another, the first and second sides defining first and second planes, respectively; a first cam operably assembled in relation to the body and having a first proximal cam end positioned between the first and second sides; a second cam operably assembled in relation to the body and having a second proximal cam end positioned between the first and second sides and adjacent to the first proximal cam end, the second cam further comprising a distal end comprising a cam body having opposing surfaces with an opening formed therethrough; an axle that rotatably attaches the second cam to the body; a channel formed by a space between the first proximal cam end and the second proximal cam end; a handle attached to the body and rotatable from a first position to a second position about a rotation point upon application of a first force; a lanyard, a portion of which is positioned through the channel; an external device passed through and out of the opening and comprising connecting hardware; wherein the body is configured to rotate with respect to the second cam from a third position to a fourth position to expand the size of the channel to form an expanded condition upon the application of the first force exerted on the handle towards the second position, whereby the lanyard is allowed to move through the channel in the expanded condition.

According to an additional aspect, a method of using a length adjusting device adapted to be tethered to a user via an external device, and capable of surrounding and selectively moving along a lanyard includes the steps of: providing a length adjusting device comprising: a body having a first side and a second side extending in spaced relation to one another, the first and second sides defining first and second planes, respectively; a first cam operably assembled in relation to the body and having a first proximal cam end positioned between the first and second sides; a second cam operably assembled in relation to the body and having a second proximal cam end positioned between the first and second sides and adjacent to the first proximal cam end, the second cam further comprising a distal end comprising a cam body having opposing surfaces with an opening formed therethrough; an axle that rotatably attaches the second cam to the body; a channel formed by a space between the first proximal cam end and the second proximal cam end; a handle attached to the body; providing a lanyard, and positioning a portion of the lanyard through the channel; providing an external device comprising connecting hardware, and passing the external device through and out of the opening; and rotating the handle from a first position to a second position upon application of a first force, wherein the rotation of the handle from the first position to the second position rotates the body with respect to the second cam from a third position to a fourth position expanding the size of the channel to form an expanded condition, and allows the lanyard to move through the channel in the expanded condition.

BRIEF DESCRIPTION OF THE DRAWINGS

The present invention will be more fully understood and appreciated by reading the following Detailed Description in conjunction with the accompanying drawings. The accompanying drawings illustrate only typical embodiments of the disclosed subject matter and are therefore not to be considered limiting of its scope, for the disclosed subject matter may admit to other equally effective embodiments.

Reference is now made briefly to the accompanying drawings, in which:

FIG. 2A is an assembled side view schematic representation of the length adjusting device shown in FIG. 1 according to an embodiment.

FIG. 2B is an assembled back/rear view schematic representation of the length adjusting device shown in FIG. 1 according to an embodiment.

FIG. 2C is an assembled perspective view schematic representation of the length adjusting device shown in FIG. 1 according to an embodiment.

FIG. 3A is an assembled side view schematic representation of the length adjusting device according to an alternative embodiment.

FIG. 3B is an assembled back/rear view schematic representation of the length adjusting device according to an alternative embodiment.

FIG. 4A is part of a series of side view schematic representations showing the sequential steps in expanding the channel of a length adjusting device shown in FIGS. 3A-3C according to an embodiment.

FIG. 4B is part of a series of side view schematic representations showing the sequential steps in expanding the channel of a length adjusting device shown in FIGS. 3A-3C according to an embodiment.

FIG. 5 is a schematic representation of the use of the length adjusting device according to an embodiment.

Figure 1A:
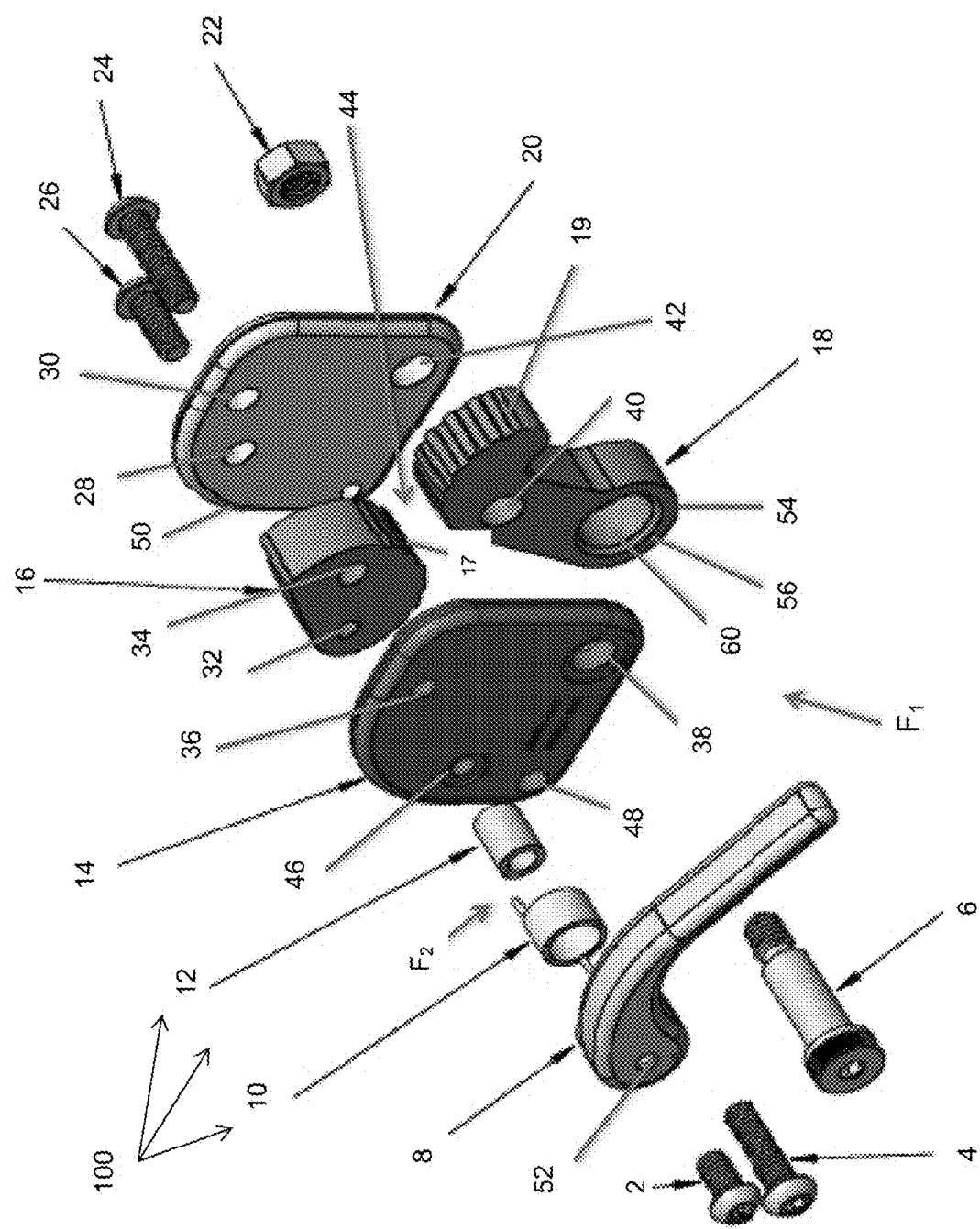
FIG. 1A is an exploded schematic representation of a length adjusting device according to an embodiment.

Where applicable, like reference characters designate identical or corresponding components and units throughout the several views, which are not to scale unless otherwise indicated. Moreover, the embodiments disclosed herein may include elements that appear in one or more of the several views or in combinations of the several views.

DETAILED DESCRIPTION OF EMBODIMENTS

Referring to FIG. 1A, in one embodiment, is an exploded schematic representation of a length adjusting device 100.

Assembled schematic representations of the length adjusting device 100 are shown in FIGS. 2A (side view), 2B (back/rear view), and 2C (perspective view). The length adjusting device 100 can include a body 1 formed of a first plate or first side 14, a second plate or second side 20 extending in spaced relation to one another, the first 14 and second 20 sides defining first A and second B planes (when fastened together, see FIG. 2B), respectively. The length adjusting device 100 can further include a first cam 16 operably assembled in relation to the body and having a first proximal cam end 17 positioned between the first 14 and second 20 sides. The first cam 16 can be (but does not have to be) positioned in fixed relation with respect to the body 1, and can be fixed by one or more fasteners 24 and 26 positioned through respective apertures 34 and 36, respectively, of first cam 16, and apertures 30 and 28, respectively, of second side 20. Fastener 24 can also be positioned through aperture 36 in first side 14, and fastener 26 can also be positioned through an aperture in first side 14 (but does not need to be).

A second cam 18 having a second proximal cam end 19 is positioned between the first 14 and second 20 sides, and is adjacent to the first proximal cam end 17. A fastener 6 attaches the second cam 18 to the body 1, and can act as an axle to rotatably/pivotably attach the second cam 18 to the body 1. Fastener 6 is preferably a shoulder bolt that can be positioned through aperture 38 in the first side 14, aperture 40 in second cam 18, aperture 19 in second side 20, and capped off by a nut 22. A channel 44 is formed by a space between the first proximal cam end and the second proximal cam end (and the two sides 14 and 20). This channel 44 can vary in size based on the pivoting of the second cam 18 with respect to the body 1 (or vice versa) about the middle smooth portion of fastener 6 (as is discussed further below with respect to FIGS. 4A-H). For example, when the second cam 18 pivots away from the first cam 16 and body 1, the channel 44 expands or becomes larger. When the second cam 18 pivots toward the first cam 16 and body 1, the channel 44 narrows or becomes smaller. The second cam 18 can include a distal end 54 including a cam body having opposing surfaces 56 and 58 (not shown) with an opening 60 formed therethrough. The cam body is preferably integral and non-rotatable with respect to the proximal cam end 19. As shown in FIG. 2B, the opposing surfaces can extend in respective planes C and D that are both parallel to the first and second planes. An elongated axis extends centrally through the opening 60 in a direction normal to the direction of rotation of the second cam 18 and to the first and second planes, whereby the opening 60 is configured to allow an external device (e.g., a carbineer) to pass through and out of the opening in a direction parallel the elongated axis and normal to the first A and second B planes.

Figure 1B:
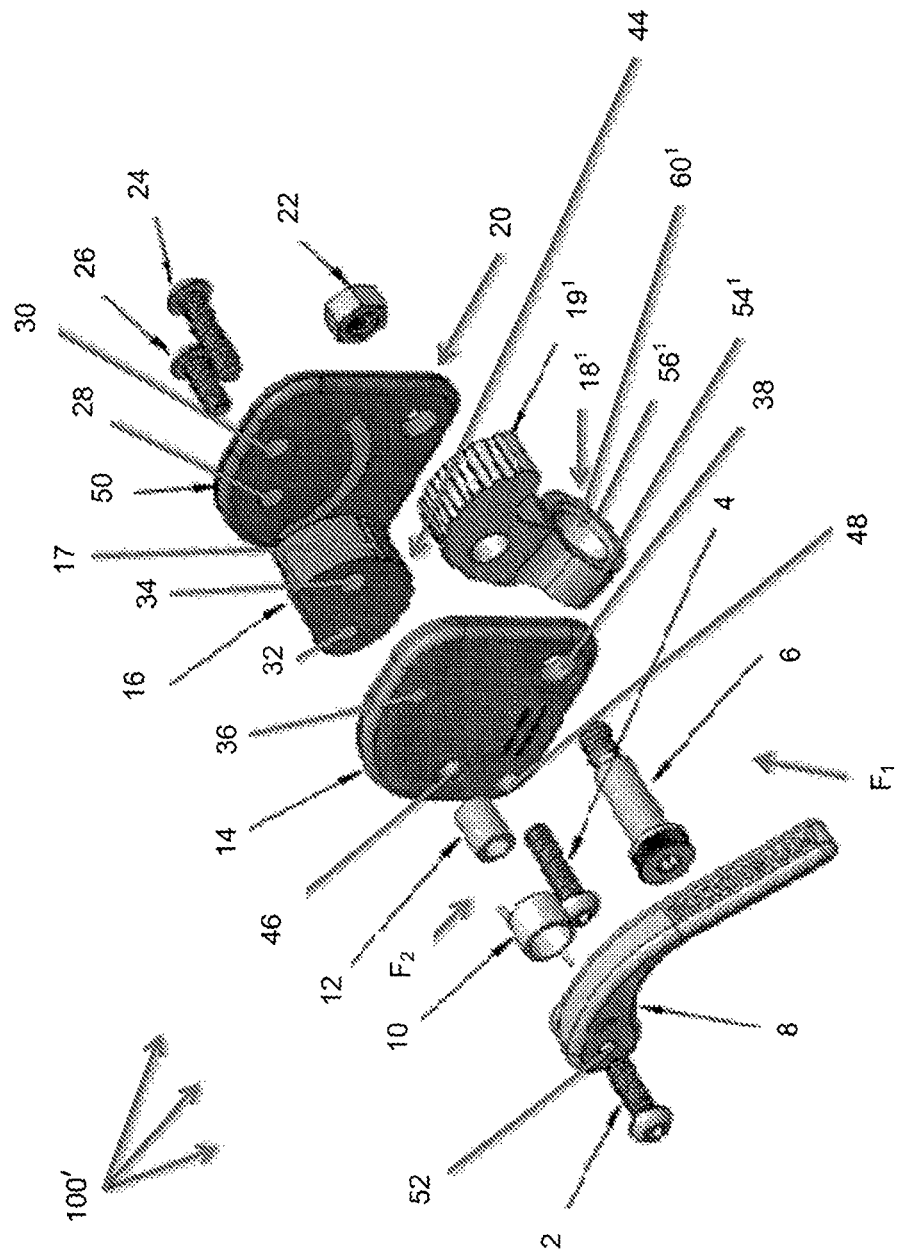
FIG. 1B is an exploded schematic representation of a length adjusting device according to an alternative embodiment.

In accordance with an alternative embodiment, FIG. 1B shows an exploded schematic representation of a length adjusting device 100'. The length adjusting device 100' is very similar to the length adjusting device 100, except for the second cam 18' configuration (which is described in further detail with respect to FIGS. 3A-C).

Figure 3C:
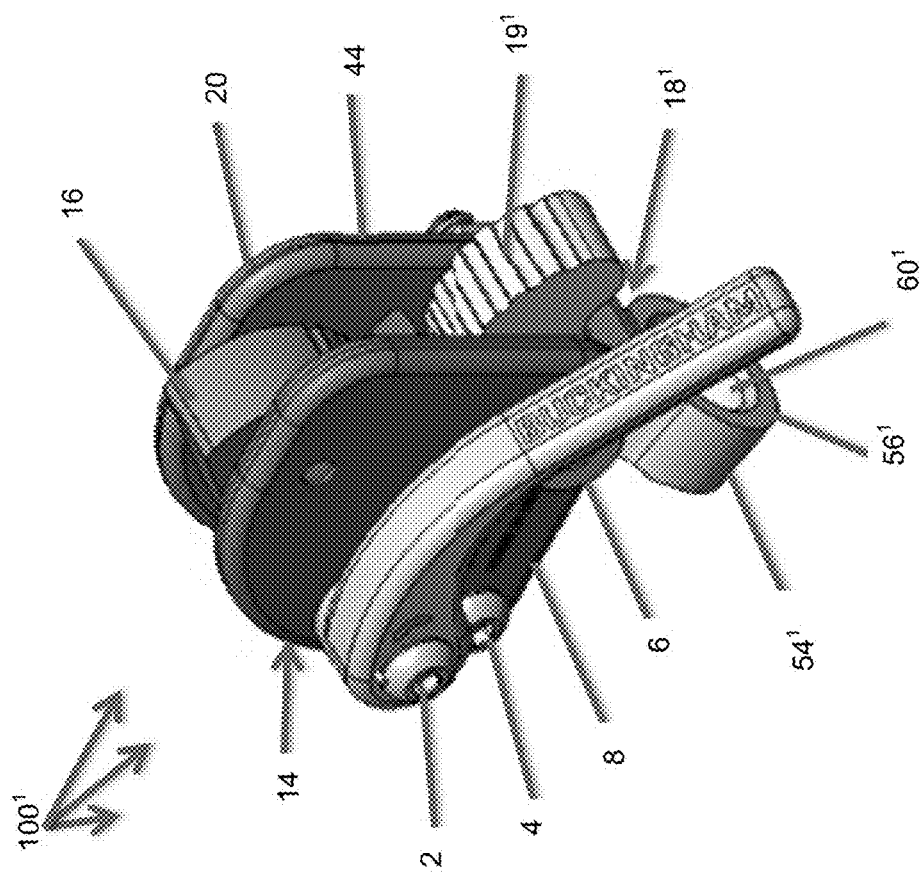
FIG. 3C is an assembled perspective view schematic representation of the length adjusting device according to an alternative embodiment.

FIGS. 3A-C show assembled schematic representations of the length adjusting device 100'-FIGS. 3A (side view), 3B (back/rear view), and 3C (perspective view). As noted above, the length adjusting device 100' is similar to the length adjusting device 100, except for the second cam 18' configuration. For example, the distal end 54' of the second cam 18' can include a cam body having opposing surfaces 56' and 58' with an opening 60' formed therethrough, where the opposing surfaces 56' and 58' extend in respective planes and that are both transverse to the first and second planes.

Further, pursuant to the alternative embodiment, an elongated axis extends centrally through the opening 60' in a direction of rotation of the second cam 18' and substantially parallel to the first A and second B planes, whereby the opening 60' is configured to allow an external device to pass through and out of the opening 60' in a direction parallel to the elongated axis and parallel to the first A and second B planes.

Turning back to FIG. 1, a handle 8 is also shown, which can be rotatably/pivotably connected to the outside of side 14 (although, the handle could also be rotatably/pivotably connected to the outside or inside of either plate/side, as should be understood and appreciated by those of skill in the art in conjunction with a review of this disclosure, and perform similar functionality as described herein). The handle 8 is shown rotatably/pivotably connected by a fastener 2 positioned through aperture 52 of the handle 8. The fastener 2 can also be positioned through a handle return spring 10 (which can be a torsion spring, or other spring that can impart the functionality of this spring described herein) and a handle bushing 12, each of which can be positioned between the handle 8 and the outside of side 14. The handle 8 can pivot from a rest position (shown in FIG. 1 and FIG. 4A) to an end position (shown in FIG. 4F) upon the application of a user actuated first force F1 (when it has a magnitude greater than a second force F2, defined below) about a rotation/pivot axis or point positioned through aperture 52. Fastener 4 can be positioned through aperture 48 of side 14 and aperture 50 of side 20, to assist with holding the body 1 together and to act as a stop (defining the end position) for handle 8 to prevent further rotation about the pivot axis upon the application of the first force F1 (see also FIGS. 4A-H). Handle return spring 10 imparts the second force F2 in the opposite direction of the first force F1 to move the handle 8 back to the rest position when the magnitude of the first force decreases below the magnitude of the second force F2.

One or more of the first proximal cam end 17 and the second proximal cam end 19 can include lanyard engaging protrusions to grip and hold a lanyard (not shown) positioned through the channel 44 when channel 44 is in a more narrowed configuration, which can be in the form of ridges or teeth of various uniform or non-uniform shapes and sizes (as should be understood and appreciated by those of skill in the art in conjunction with a review of this disclosure). These lanyard engaging protrusions can, but do not have to, cover the entire length or width of either proximal cam end, and can just cover a lesser portion of an entire proximal cam end.

Figure 4C:
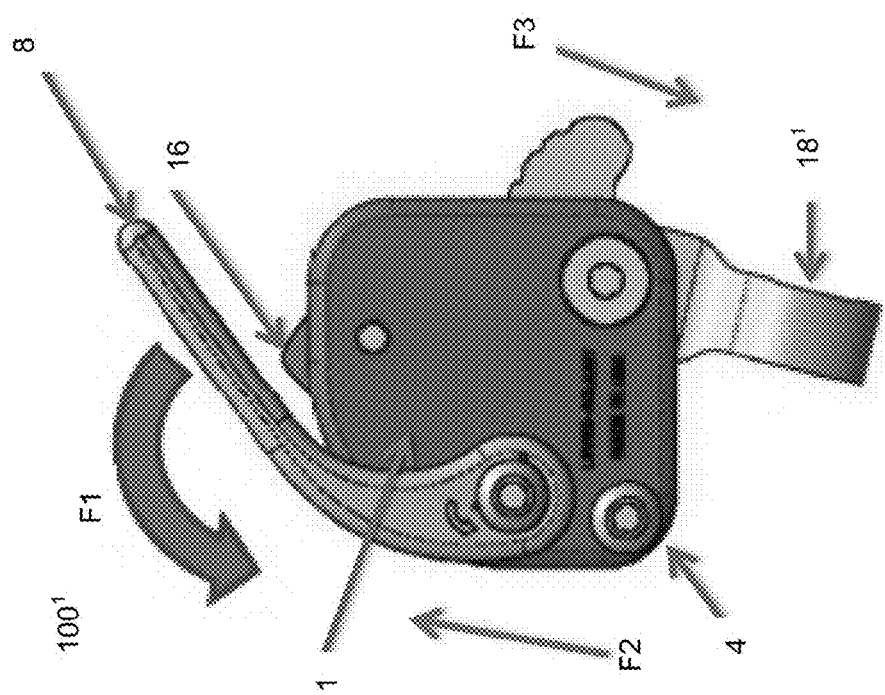
FIG. 4C is part of a series of side view schematic representations showing the sequential steps in expanding the channel of a length adjusting device shown in FIGS. 3A-3C according to an embodiment.
Figure 4D:
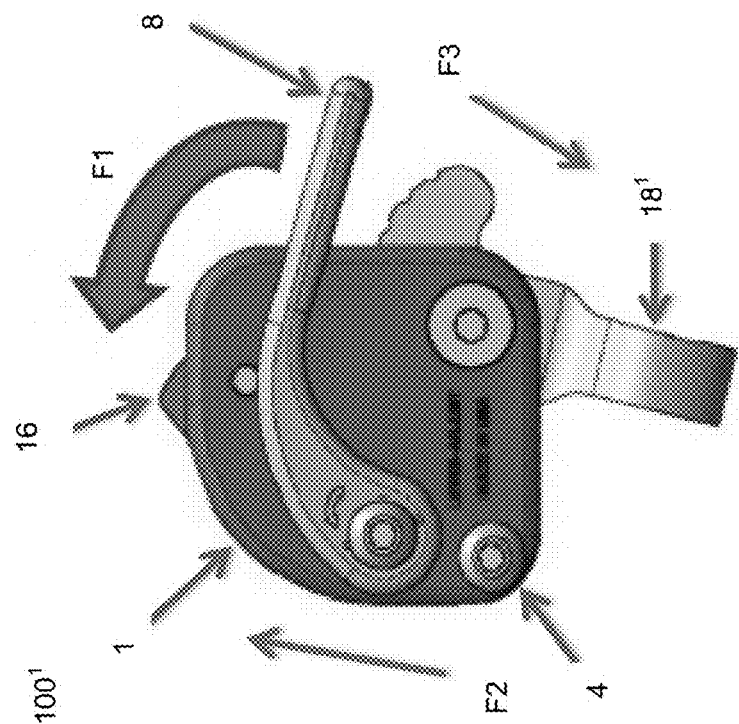
FIG. 4D is part of a series of side view schematic representations showing the sequential steps in expanding the channel of a length adjusting device shown in FIGS. 3A-3C according to an embodiment.
Figure 4F:
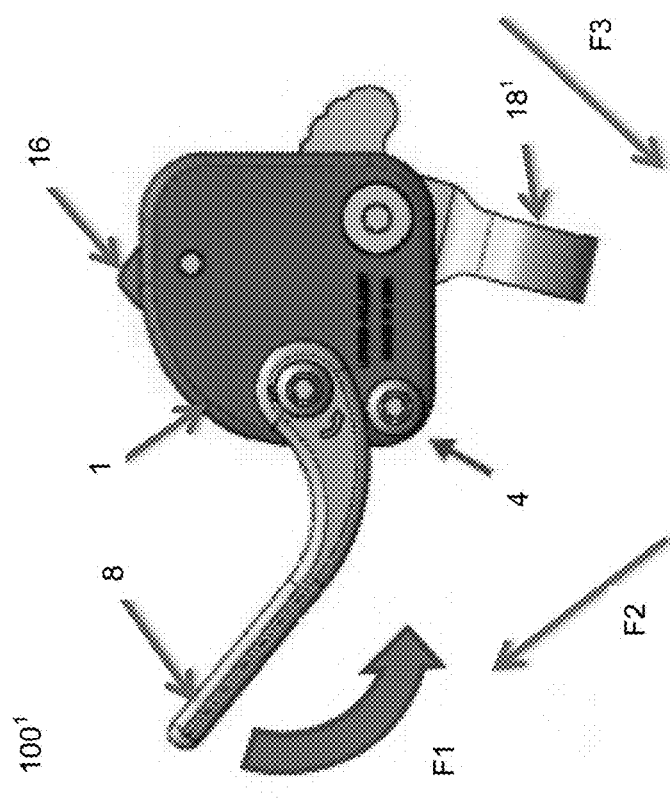
FIG. 4F is part of a series of side view schematic representations showing the sequential steps in expanding the channel of a length adjusting device shown in FIGS. 3A-3C according to an embodiment.
Figure 4E:
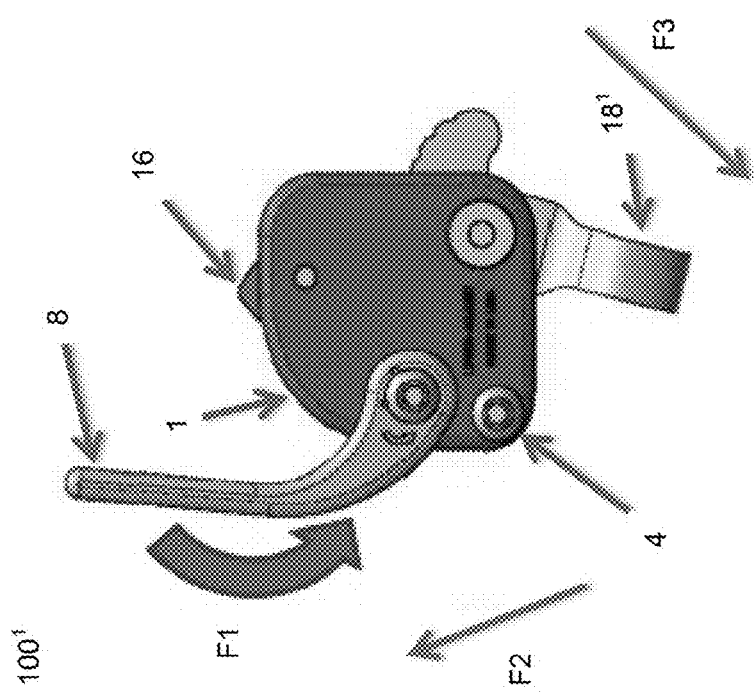
FIG. 4E is part of a series of side view schematic representations showing the sequential steps in expanding the channel of a length adjusting device shown in FIGS. 3A-3C according to an embodiment.
Figure 4G:
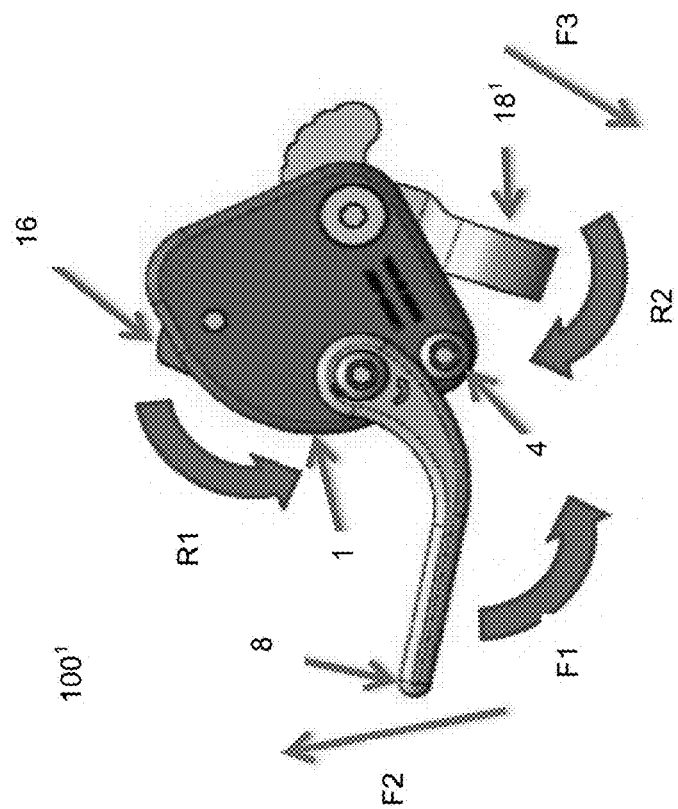
FIG. 4G is part of a series of side view schematic representations showing the sequential steps in expanding the channel of a length adjusting device shown in FIGS. 3A-3C according to an embodiment.
Figure 4H:
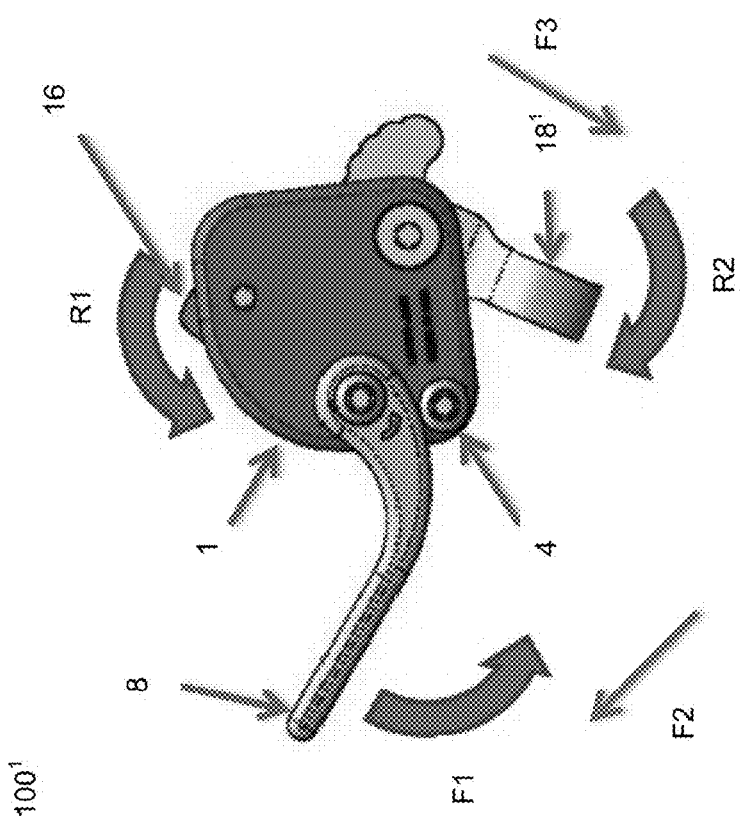
FIG. 4H is part of a series of side view schematic representations showing the sequential steps in expanding the channel of a length adjusting device shown in FIGS. 3A-3C according to an embodiment.

Turning to FIGS. 4A-H, in one embodiment, a series of side view schematic representations showing the sequential steps in expanding channel 44 of length adjusting device 100' are provided (similar steps can be taken to expand channel 44 of length adjusting device 100). Starting at FIG. 4A, handle 8 is shown in the rest position, where the force F2 can be applied by a return mechanism 10 (e.g., torsion spring) around rotation/pivot axis or point positioned through aperture 52 (see FIG. 1), and can maintain handle 8 in the rest position. When in use, a force F3 is applied to the second cam 18' in the direction as shown. This force F3 is typically applied by a rope/webbing/body harness positioned around a user, which is attached to a connecting hardware 300 (e.g., a carabineer) that is also connected to the second cam 18' through the aperture 60' (see FIG. 5). Turning to FIG. 4B, a user actuated force F1 is applied to handle 8 in the opposite direction of force F2 around rotation/pivot axis or point positioned through aperture 52. Force F1 is shown overcoming force F2 in FIGS. 4C-4F up until the point where handle 8 meets/contacts the fastener/handle stop 4, and reaches its fully pivoted position beyond the rest position shown in FIG. 4A. Once the handle 8 meets the meets/contacts the fastener/handle stop 4, the force F1 on the fastener/handle stop 4 causes the body 1 to rotate in a direction R1, and the force F3 causes the second cam 18' to rotate in direction R2 from a rest position to its fully "rotated open" position where the second cam's rotation can be stopped by the first plate or first side 14 and the second plate or second side 20 (see FIGS. 4G-H). Stated differently, the body 1 and the second cam 18' rotate in opposite directions with respect to one another based on equal and opposite forces F1 and F3, thereby expanding the size of channel 44. The practical effect of this expansion of channel 44 is to allow a lanyard positioned therethrough to move through the length adjusting device 100', either lengthening or shortening the effective length of the lanyard positioned therethrough (see FIG. 5).

Turning to FIG. 5, in one embodiment, a schematic representation of the length adjusting device in use is provided. A user 600 is shown with a body belt/harness 200 positioned around the user's waist, which is connected to a fixed end 403 of a lanyard 400 near one side of the user's body, where the lanyard 400 is positioned around a pole or other structure 500 from the fixed end 403 to an adjustment end 401. The adjustment end 401 is connected to a length adjusting device 100/100' (the length adjusting device 100' of FIG. 3A is shown) positioned near the other side of the user's body through the channel 44 forming an adjustable positioning lanyard (or APL). The connecting hardware 300 is shown positioned through the opening 60' of length adjusting device 100', and connected on an opposite end to the body belt/harness 200. In this configuration, the user can perform the steps described with respect to FIGS. 4A-H, actuating the handle 8 with one hand to adjust the length of the lanyard 400 through the channel 44 as may be needed to position the user closer or further away from the structure/pole 500 (as should be understood and appreciated by those of skill in the art in conjunction with a review of this disclosure).

While embodiments of the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

What is claimed is:

1. A length adjusting device comprising:
    a body having a first side and a second side extending in spaced relation to one another, the first and second sides defining first and second planes, respectively;
    a first cam operably assembled in relation to the body and having a first proximal cam end positioned between the first and second sides;
    a second cam operably assembled in relation to the body and having a second proximal cam end positioned between the first and second sides and adjacent to the first proximal cam end, wherein the second cam further comprises a distal end comprising a cam body having opposing surfaces with an opening formed therethrough, wherein the opposing surfaces extend in respective planes and that are both transverse to the first and second planes, and wherein an elongated axis extends centrally through the opening in a direction of rotation of the second cam and substantially parallel to the first and second planes, whereby the opening is configured to allow an external device to pass through and out of the opening in a direction parallel to the elongated axis and parallel to the first and second planes;
    an axle that rotatably attaches the second cam to the body;
    a channel formed by a space between the first proximal cam end and the second proximal cam end;
    a handle attached to the body and rotatable from a first position to a second position about a rotation point upon application of a first force;
    wherein the body is configured to rotate with respect to the second cam from a third position to a fourth position to expand the size of the channel upon the application of the first force exerted on the handle towards the second position.

2. The length adjusting device of claim 1, wherein the first cam is positioned in fixed relation with respect to the body.

3. The length adjusting device of claim 1, wherein the cam body is integral and non-rotatable with respect to the second proximal cam end of the second cam.

4. The length adjusting device of claim 1, wherein the external device is passed through and out of the opening in a directional parallel the elongated axis and parallel to the first and second planes and comprises hardware.

5. The length adjusting device of claim 1, wherein the external device is a connector selected from the group consisting of a carabineer, a snap hook, a rope snap, and a ladder snap.

6. The length adjusting device of claim 1, wherein the second cam is rotatable about the axle with respect to the body from a fifth position to a sixth position to expand the size of the channel upon the application of a second force exerted on the distal end of the second cam towards the sixth position.

7. The length adjusting device of claim 1, further comprising a return mechanism attached to the body and to the handle for assisting the handle to return to the first position.

8. The length adjusting device of claim 7, wherein the return mechanism is a torsion spring.

9. The length adjusting device of claim 1, wherein at least one of the first proximal cam end and the second proximal cam end further comprises lanyard engaging protrusions on at least a portion thereof.

10. A length adjusting device comprising:
    a body having a first side and a second side extending in spaced relation to one another, the first and second sides defining first and second planes, respectively;
    a first cam operably assembled in relation to the body and having a first proximal cam end positioned between the first and second sides;
    a second cam operably assembled in relation to the body and having a second proximal cam end positioned between the first and second sides and adjacent to the first proximal cam end;
    an axle that rotatably attaches the second cam to the body;
    a channel formed by a space between the first proximal cam end and the second proximal cam end;
    wherein the second cam is configured to rotate with respect to the body from a first position to a second position to expand the size of the channel upon the application of a first force exerted on the second cam towards the second position; and wherein the second cam is rotatable about the axle with respect to the body from a third position to a fourth position to expand the size of the channel upon the application of a second force exerted on the distal end of the second cam towards the fourth position.

11. A system for using a length adjusting device adapted to be tethered to a user via an external device, and capable of surrounding and selectively moving along a lanyard, the system comprising:
a length adjusting device comprising:
a body having a first side and a second side extending in spaced relation to one another, the first and second sides defining first and second planes, respectively;
a first cam operably assembled in relation to the body and having a first proximal cam end positioned between the first and second sides;
a second cam operably assembled in relation to the body and having a second proximal cam end positioned between the first and second sides and adjacent to the first proximal cam end, the second cam further comprising a distal end comprising a cam body having opposing surfaces with an opening formed therethrough, wherein an elongated axis extends centrally through the opening in a direction of rotation of the second cam and substantially parallel to the first and second planes, wherein the external device passes through and out of the opening in a direction parallel the elongated axis and parallel to the first and second planes;
an axle that rotatably attaches the second cam to the body;
a channel formed by a space between the first proximal cam end and the second proximal cam end;
a handle attached to the body and rotatable from a first position to a second position about a rotation point upon application of a first force;
a lanyard, a portion of which is positioned through the channel;
an external device passed through and out of the opening and comprising connecting hardware;
wherein the body is configured to rotate with respect to the second cam from a third position to a fourth position to expand the size of the channel to form an expanded condition upon the application of the first force exerted on the handle towards the second position, whereby the lanyard is allowed to move through the channel in the expanded condition.

12. The system of claim 11, wherein the first cam is positioned in fixed relation with respect to the body.

13. The system of claim 11, wherein the connecting hardware is a connector selected from the group consisting of a carabineer, a snap hook, a rope snap, and a ladder snap.

14. The system of claim 11, wherein the second cam is rotatable about the axle with respect to the body from a fifth position to a sixth position to expand the size of the channel upon the application of a second force exerted on the distal end of the second cam towards the sixth position by the external device.

15. The system of claim 11, further comprising a return mechanism attached to the body and to the handle for assisting the handle to return to the first position.

16. The system of claim 11, wherein at least one of the first proximal cam end and the second proximal cam end further comprises lanyard engaging protrusions on at least a portion thereof.

17. A method of using a length adjusting device adapted to be tethered to a user via an external device, and capable of surrounding and selectively moving along a lanyard comprising the steps of:
providing a length adjusting device comprising:
a body having a first side and a second side extending in spaced relation to one another, the first and second sides defining first and second planes, respectively;
a first cam operably assembled in relation to the body and having a first proximal cam end positioned between the first and second sides;
a second cam operably assembled in relation to the body and having a second proximal cam end positioned between the first and second sides and adjacent to the first proximal cam end, the second cam further comprising a distal end comprising a cam body having opposing surfaces with an opening formed therethrough;
an axle that rotatably attaches the second cam to the body;
a channel formed by a space between the first proximal cam end and the second proximal cam end;
a handle attached to the body;
providing a lanyard, and positioning a portion of the lanyard through the channel;
providing an external device comprising connecting hardware, and passing the external device through and out of the opening;
rotating the handle from a first position to a second position upon application of a first force, wherein the rotation of the handle from the first position to the second position rotates the body with respect to the second cam from a third position to a fourth position expanding the size of the channel to form an expanded condition, and allows the lanyard to move through the channel in the expanded condition; and
rotating the second cam about the axle with respect to the body from a fifth position to a sixth position to expand the size of the channel by applying a second force on the distal end of the second cam towards the sixth position by the external device.

18. The method of claim 17, further comprising the step of rotating the handle from the second position to the first position by a return mechanism attached to the body and to the handle.

19. The method of claim 17, further comprising the step of engaging the lanyard with lanyard engaging protrusions positioned on at least a portion of at least one of the first proximal cam end and the second proximal cam end.

* * * * *